(12) United States Patent
Nikol et al.

(10) Patent No.: US 6,563,556 B2
(45) Date of Patent: May 13, 2003

(54) LIQUID CRYSTAL COLOR PICTURE SCREEN

(75) Inventors: Hans Nikol, Aachen (DE); Thomas Jüstel, Aachen (DE); Robert Van Asselt, Eindhoven (NL); Dirk Jan Broer, Geldrop (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 126 days.

(21) Appl. No.: 09/803,333

(22) Filed: Mar. 9, 2001

(65) Prior Publication Data

US 2001/0033348 A1 Oct. 25, 2001

(30) Foreign Application Priority Data

Mar. 14, 2000 (DE) .......................... 100 12 326

(51) Int. Cl.$^7$ ............................... G02F 1/1335
(52) U.S. Cl. .................. 349/69; 349/70; 349/71; 428/1.1; 428/690
(58) Field of Search .................... 349/70, 71, 164; 428/690, 1.1

(56) References Cited

U.S. PATENT DOCUMENTS

| 4,211,473 A | * | 7/1980 | Shanks ................ 349/164 |
| 4,556,287 A | * | 12/1985 | Funada et al. .......... 349/164 |
| 4,882,617 A | * | 11/1989 | Vriens ................. 348/779 |
| 6,295,106 B1 | * | 9/2001 | Fukuzawa et al. ........ 349/71 |

* cited by examiner

Primary Examiner—Robert H. Kim
Assistant Examiner—David Chung
(74) Attorney, Agent, or Firm—Aaron Waxler

(57) ABSTRACT

The invention describes a liquid crystal color picture screen with an improved luminous efficacy and an improved viewing angle. The liquid crystal color picture screen comprises a photoluminescent layer (7) which contains a dichroically absorbing color agent and an isotropically emitting color agent.

11 Claims, 1 Drawing Sheet

LIQUID CRYSTAL COLOR PICTURE SCREEN

BACKGROUND OF THE INVENTION

1. Field of the Invention

The invention relates to a liquid crystal color picture screen provided with a light source, a polarizer, a liquid crystal cell comprising two transparent plates between which a liquid crystal material is present, said plates each supporting a matrix of electrodes, a front plate, and a photoluminescent layer.

2. Description of the Prior Art

Liquid crystal picture screens are based on the principle that light from an external light source either does or does not pass through the layer of liquid crystals. The resulting bright and dark dots constitute a picture. The use of color filters also renders it possible to manufacture liquid crystal color picture screens. The use of color filters is not very efficient, because a major portion of the incident light is absorbed by these color filters. The combination of a polarizer-analyzer unit with color filters is also unfavorable, because a major portion of the incident light is converted into thermal energy. These effects result in a reduction of the brightness and of the energy efficiency of the liquid crystal color picture screen.

A further problem is the reduced viewing angle of liquid crystal picture screens, which results from the operating principle and construction of a liquid crystal picture screen.

SUMMARY OF THE INVENTION

A liquid crystal color picture screen is known from EP 0 889 350 A1 in which a photoluminescent layer having an isotropic absorption and a polarized chromatic emission is used instead of a conventional polarizer. The same document also describes a liquid crystal color picture screen in which a photoluminescent layer is provided between the liquid crystal cell and the viewer. A particularly favorable aspect of this arrangement is that the emission of the colored light is independent of viewing angle narrowing effects of the liquid crystal layer. The photoluminescent layer comprises, for example, a polyolefin film which is doped with a dichroic fluorophor, preferably poly(phenyleneethynylene) derivatives.

The fluorophors described in the patent application, however, usually have a very low emission quantum efficiency, a low dichroic ratio of parallel absorption to perpendicular absorption, or a short useful life.

The invention has for its object to provide an improved liquid crystal color picture screen with an improved viewing angle and an improved luminous efficacy.

This object is achieved by means of a liquid crystal color picture screen provided with a light source, a polarizer, a liquid crystal cell comprising two transparent plates between which a liquid crystal material is present, said plates each supporting a matrix of electrodes, a front plate, and a photoluminescent layer, which layer comprises a dichroically absorbing color agent and an isotropically emitting color agent.

The arrangement of the functional elements in different color agent molecules renders it possible to synthesize and use optimized materials for the respective functions. A photoluminescent layer which has a high absorption and a high emission quantum efficiency increases the efficiency of the entire liquid crystal color picture screen.

It may be advantageous that the dichroically absorbing color agent and the isotropically emitting color agent are interlinked with one another.

An intramolecular energy transfer from one molecule unit to another may be more effective than an intermolecular energy transfer between two molecules.

It is preferred in this embodiment that the dichroically absorbing color agent and the isotropically emitting color agent are mutually interlinked by means of one or several compounds chosen from the group comprising phenylene units, methylene units, difluoromethylene units, peptide units, norbornyl units, spiro compounds, pyrazine units, cyclohexyl units, cyclopentyl units, and cyclobutyl units.

These units do not interfere with the electronic structure of the dichroically absorbing color agent or the isotropically emitting color agent, neither do they have electronic interactions therewith.

It is particularly preferred that the dichroically absorbing color agent has a high extinction coefficient for the wavelength emitted by the light source.

It is furthermore preferred that the isotropically emitting color agent has a low extinction coefficient for the wavelength absorbed by the dichroically absorbing color agent.

The dichroically absorbing color agent is effectively and exclusively excited under these conditions.

It is furthermore advantageous that the isotropically emitting color agent has a high extinction coefficient for the wavelength emitted by the dichroically absorbing color agent.

An effective energy transfer between the dichroically absorbing color agent and the isotropically emitting color agent is safeguarded under these conditions.

It is furthermore preferred that the isotropically emitting color agent comprises a perylene derivative, a laser color agent derivative, or a stilbene derivative.

The $\pi\pi^*$ energy level of these molecules is occupied by an energy transfer from the absorber to the emitter. The $\pi\pi^*$ energy level lies a few nanometers bathochromically shifted towards the dichroic absorption of the absorber. The emission of the colored light then takes place at wavelengths of 400 nm and higher. All colors can be created through variation of the isotropically emitting color agent.

It is furthermore advantageous that the dichroically absorbing color agent and the isotropically emitting color agent are embedded in a liquid crystal medium or in an elongate polymer, or are epitaxially grown on an anisotropic substrate.

The color agent molecules of the photoluminescent layer are arranged on a carrier in a preferred direction such that their longitudinal axes are oriented in the same direction. It is true in principle that the photoluminescent layer and the liquid crystal cells should be arranged as closely together as possible so as to prevent parallaxes.

It is furthermore preferred that the photolurninescent layer comprises a plurality of parallel strips, a pixel-type arrangement, or a zonal arrangement.

The strips comprise alternately a photoluminescent layer with dichroically absorbing color agent and a color agent which emits isotropically in one of the three basic colors. A pixel-type arrangement is thus obtained in combination with the grid-type electrodes.

In a preferred embodiment, the liquid crystal color picture screen comprises a color filter between the front plate and the photoluminescent layer.

Some isotropically emitting color agents such as, for example, perylene derivatives may be excited by incident ambient light. The contrast of the liquid crystal color picture screen may be impaired by this excitation. The use of a color filter can prevent this.

In a particularly preferred embodiment, the front plate comprises a UV mirror.

This UV mirror reflects non-absorbed UV radiation back into the optical system. On the one hand, this protects the viewer from this UV radiation, while on the other hand the luminous efficacy of the liquid crystal color picture screen is enhanced by this "recycling".

BRIEF DESCRIPTION OF THE DRAWINGS

The invention will be explained in more detail below with reference to two Figures and two embodiments, with FIG. 1 diagrammatically showing the construction of a liquid crystal color picture screen, and FIG. 2 showing the strip-type arrangement of electrodes, liquid crystal material, and photoluminescent layer.

DETAILED DESCRIPTION OF THE INVENTION

Figure 1:
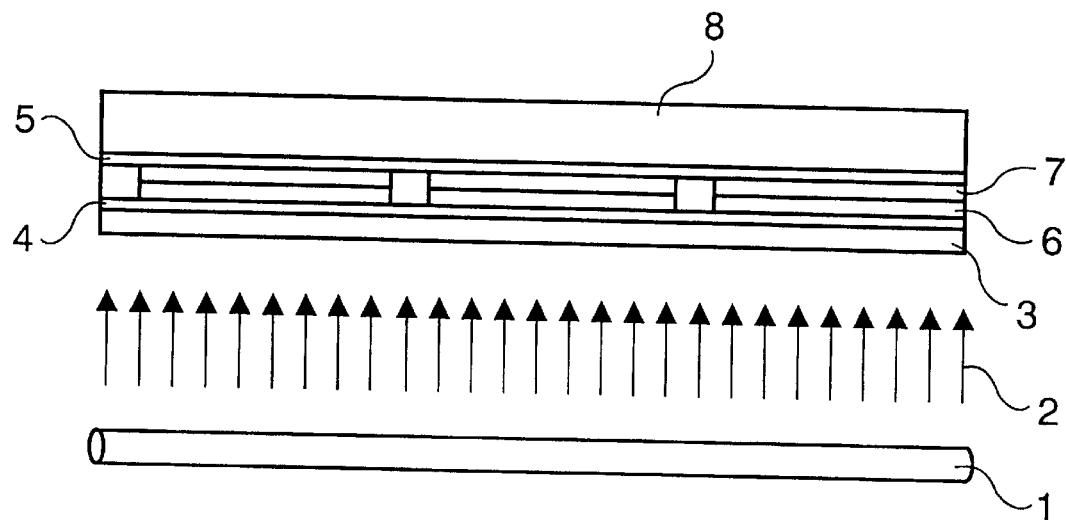

In FIG. 1, a liquid crystal color picture screen comprises a light source 1 which emits UV radiation 2. The emitted UV radiation 2 arrives at a polarizer 3 and from there at a liquid crystal cell which comprises two transparent plates 4 and 5 which each support a matrix of electrodes 9, 10. The plates 4 and 5, for example made of glass or a synthetic resin material such as polyester, polycarbonate, polyethersulfon, or polyolefin, in particular polynorbornene or polypropylene, may also comprise an orientation layer of, for example, polyimide or $SiO_2$. A liquid crystal material 6 is arranged between the plates 4 and 5. In addition, a photoluminescent layer 7 is present as close as possible to the liquid crystal material 6. The liquid crystal material 6 and the photoluminescent layer 7 may have, for example, a strip-type, a pixel-type, or a zonal arrangement. The liquid crystal material 6 preferably comprises TN (twisted nematic) liquid crystals because these liquid crystals, i.e. the TN effect thereof, achieve a higher contrast and show an independence of the wavelength of the UV radiation 2. Liquid crystal materials which may be used are, for example, p-alkylbenzylidene-p'-cyanoaniline, p-alkoxybenzylidene-p'-cyanoaniline, cyanobiphenylene, phenylcyclohexanene, biphenylcyclohexanene, or mixtures of these liquid crystal materials. The liquid crystal material 6 may alternatively be STN (supertwisted nematic) liquid crystals, VAN (vertically aligned) liquid crystals, or OCB (optically compensated bend) liquid crystals. The photoluminescent layer 7 comprises a dichroically absorbing color agent and an isotropically emitting color agent. The two color agent molecules may be interlinked. Interlinking compounds used for this may be, for example, one or several phenylene units, methylene units, difluoromethylene units, peptide units, norbornyl units, spiro compounds, pyrazine units, cyclohexyl units, cyclopentyl units, or cyclobutyl units. The dichroically absorbing color agent may be, for example, a p-octiphenyl compound. This p-octiphenyl compound may be substituted with one or several ramified or unramified alkyl chains. The alkyl chains, for example butyl groups, may furthermore be mutually interlinked. The isotropically emitting color agent may comprise, for example, a perylene derivative such as 16,17-dimethoxydinaphtho[1, 2,3-cd;3',2',1'-lm]perylene-5,10-dione, dinaphtho[1,2,3-cd:3', 2',1'-lm]perylene-5,10dione, dinaphtho[1,2,3-cd:1',2', 3'-lm]perylene-9,18-dione, or a diimide which is derived from 3,4,9,10-perylenetetracarbonic acid. The isotropically emitting color agent may alternatively be a laser color agent such as, for example, 2,5-bis(4-biphenylyl)oxazole (BBO), 2-(biphenyl-4-yl)-6-phenylbenzoxazole (PBBO), p-terphenyl, a cumarine derivative, a phenoxazine color agent, or a 3,6-bis(alkylamino)-9-phenylxanthylium compound (rhodamine). Furthermore, the isotropically emitting color agent may be a stilbene derivative such as, for example, 4-N,N-diphenylaminostilbene, 1,4-bis(4-N,N-diphenylaminophenyl)butadiene, 1,4-bis(4-N,N-diphenylaminostyryl)benzole, 1,3-bis(4-N,N-diphenylaminostyryl)benzole, 1,4-bis(4-N,N-diphenylaminostyryl)-3,5-dimethoxybenzole, 1,4-bis(4-N, N-diphenylamino-2'-phenylstyryl)benzole. The dichroically absorbing color agent and the isotropically emitting color agent are embedded, for example, in a liquid crystal medium or in an elongate polymer. Alternatively, however, they may be epitaxially grown on an anisotropic substrate.

It is also possible for the photoluminescent layer 7 to have a layered structure with an upper and a lower layer. The lower layer, which is closer to the light source than the upper layer, comprises only the dichroically absorbing color agent which is embedded in a preferred direction in a liquid crystal medium or in an elongate polymer, or is epitaxially grown on an anisotropic substrate. The upper layer comprises the isotropically emitting color agent which is to be provided without orientation.

If the dichroically absorbing color agent and the isotropically emitting color agent are embedded in a liquid crystal medium, it may be advantageous that a protective layer or passivating layer is provided between the liquid crystal material 6 and the photoluminescent layer 7. This protective layer or passivating layer prevents an alignment of the liquid crystal medium when an electric field is applied to the electrodes 9, 10 or when this field is switched off. Another possibility for preventing this is to interlink the molecules of the liquid crystal medium with one another after the process of embedding of the dichroically absorbing color agent and the isotropically emitting color agent.

Alternatively, the photoluminescent layer 7 may be present outside the liquid crystal cell, between the transparent plate 5 and the front plate 8.

In principle, such a liquid crystal color picture screen may also comprise an active matrix addressing. In this case, one of the two transparent plates 4, 5 acting as an electrode comprises an array of active switching elements such as, for example, metal-insulator-metal (MIM) elements or thin-film transistors (TFT), while an electrode made of ITO is present on the other plate.

Figure 2:
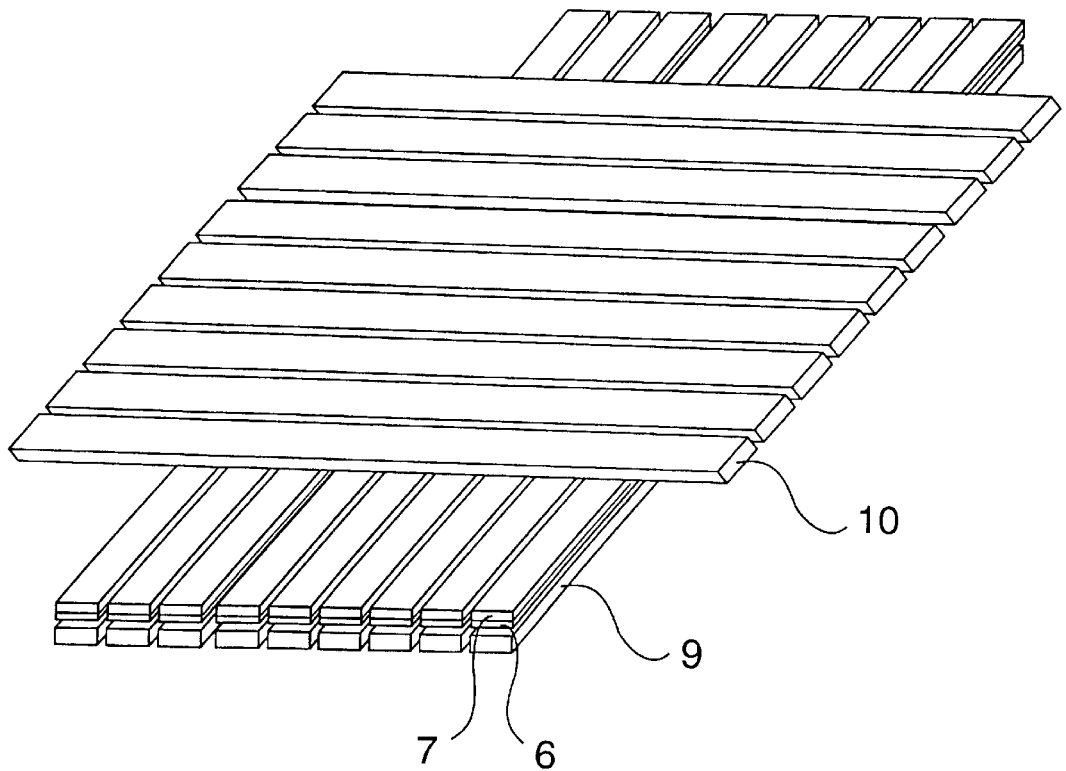

FIG. 2 shows the strip-type arrangement of the liquid crystal material 6 and the photoluminescent layer 7. In addition, several parallel strip-shaped electrodes 9 and 10 are present above and below these two layers. The electrodes 9 and 10 are made, for example, of ITO.

The operating principle of a liquid crystal color picture screen is as follows: a UV ray 2 emitted by the light source 1 arrives at a polarizer 3 which transmits only light of a given oscillation direction. The oscillation plane of the polarized light beam incident on a liquid crystal of the liquid crystal material 6 is rotated in accordance with the longitudinal molecule axes when passing through the cell. When a voltage is applied to the electrodes 9 and 10, the liquid crystals will align themselves parallel to the electric field. The oscillation plane of the polarized light is no longer rotated now. Subsequently, the UV radiation arrives at the dichroically absorbing color agent, which does or does not absorb the UV light, depending on its polarization direction. After this absorption, the obtained energy is transmitted to the isotropically emitting color agent. The energy transfer takes place intramolecularly or intermolecularly, depending on whether the two color agents are interlinked or not. The isotropically emitting color agent emits light with a visible wavelength which reaches the viewer through the front plate 8.

Embodiments of the invention are described below, representing examples of how the invention may be implemented in practice.

Embodiment 1

A liquid crystal color picture screen had a UV lamp as the light source 1, emitting UV light 2 with a wavelength of 366 nm. The liquid crystal color picture screen further comprised a polarizer 3. The liquid crystal cell of the liquid crystal color picture screen comprised a lower transparent plate 4 and an upper transparent plate 5, both comprising glass. Several parallel strip-shaped electrodes 9 and 10 of ITO were provided on the transparent plates 4 and 5. The electrodes 9 were arranged so as to be rotated through 90° with respect to the electrodes 10. A strip-type photoluminescent layer 7 was arranged between the liquid crystal cell and the upper transparent plate 5. Each strip of the photoluminescent layer 7 comprised a p-octiphenyl derivative as the dichroically absorbing color agent. In addition, a color agent which emitted isotropically in one of the basic colors was present in each strip. The blue-emitting color agent was 4-N,N-diphenylaminostilbene, the red-emitting color agent was sulforhodamine B, and the green-emitting color agent was 16,17-dimethoxydinaphtho[2,3-cd;3',2',1'-lm]perylene-5,10-dione. The two color agents were embedded in a liquid crystal medium of cyanobiphenylene. In addition, the liquid crystal color picture screen had a front plate 8 of glass.

The total liquid crystal color picture screen had an improved viewing angle and an enhanced luminous efficacy.

Embodiment 2

A liquid crystal color picture screen had a UV lamp as its light source 1, emitting LTV light 2 with a wavelength of 366 nm. The liquid crystal color picture screen further comprised a polarizer 3. The liquid crystal cell of the liquid crystal color picture screen had a lower transparent plate 4 and an upper transparent plate 5, both comprising glass. Several parallel, strip-shaped electrodes 9 and 10 of ITO were provided on the transparent plates 4 and 5. The electrodes 9 were arranged so as to be rotated through 90° with respect to the electrodes 10. A strip-type photoluminescent layer 2 was arranged between the liquid crystal cell and the upper transparent plate 5. Each strip of the photoluminescent layer 7 comprised besides cyanobiphenylene as the liquid crystal medium a p-octiphenyl derivative as the dichroically absorbing color agent. The dichroically absorbing color agent was linked to an isotropically emitting color agent by way of a methylene group in the $2^{nd}$ position of the first phenyl ring of the p-octiphenyl derivative. The blue-emitting color agent used was dinaphtho[1,2,3-cd:3',2',1'-lm]perylene-5,10-dione, the red-emitting color agent sulforhodamine B, and the green-emitting color agent 16,17-dimehtoxydinaphtho[1,2,3,-cd;3',2',1'-lm]perylene-5,10-dione. The liquid crystal color picture screen also comprised a front plate 8 of glass.

The total liquid crystal color picture screen had an improved viewing angle and an enhanced luminous efficacy.

What is claimed is:

1. A liquid crystal color picture screen provided with a light source, a polarizer, a liquid crystal cell having an upper and a lower transparent plate between which a liquid crystal material is present, said upper and lower transparent plates each supporting a matrix of electrodes, a front plate, and a photoluminescent layer, said photoluminescent layer being arranged between said liquid crystal material and said upper transparent plate, and having a dichroically absorbing color agent and an isotropically emitting color agent.

2. The liquid crystal color picture screen of claim 1, wherein said dichroically absorbing color agent and said isotropically emitting color agent are interlinked with one another.

3. The liquid crystal color picture screen as claimed in claim 2, wherein said dichroically absorbing color agent and said istropically emitting color agent are mutually interlinked by means of one or several compounds chosen from a group comprising phenylene units, methylene units difluoromethylene units, peptide units, norbornyl units, spiro compounds, pyrazine units, cyclohexyl units, cyclopentyl units, and cyclobutyl units.

4. The liquid crystal color picture screen of claim 1, wherein said dichroically absorbing color agent has a high extinction coefficient for the wavelength emitted by said light source.

5. The liquid crystal color picture screen of claim 1, wherein said isotropically emitting color agent has a low extinction coefficient for the wavelength absorbed by the dichroically absorbing color agent.

6. The liquid crystal color picture screen of claim 1, wherein said isotropically emitting color agent has a high extinction coefficient for the wavelength emitted by said dichroically absorbing color agent.

7. The liquid crystal color picture screen of claim 1, wherein said isotropically emitting color agent has a perylene derivative, a laser color agent derivative, or a stilbene derivative.

8. The liquid crystal color picture screen of claim 1, wherein said dichroically absorbing color agent and said isotropically emitting color agent are embedded in a liquid crystal medium or in an elongate polymer, or are epitaxially grown on an anisotropic substrate.

9. The liquid crystal color picture screen of claim 1, wherein said photoluminescent layer has a plurality of parallel strips, a pixel-type arrangement, or a zonal arrangement.

10. The liquid crystal color picture screen of claim 1, wherein said liquid crystal color picture screen has a color filter between said front plate and said photoluminescent layer.

11. The liquid crystal color picture screen of claim 1, wherein said front plate has a UV mirror.

* * * * *